HYBRID SOLID STATE DEVICE

Original Filed Aug. 7, 1963

INVENTOR
Richard H. Moyer

BY Paris, Haskell & Levine

ATTORNEY

United States Patent Office 3,305,814
Patented Feb. 21, 1967

3,305,814
HYBRID SOLID STATE DEVICE

Richard H. Moyer, Southampton, Pa., assignor, by mesne assignments, to United Aircraft Corporation, a corporation of Delaware Original application Aug. 7, 1963, Ser. No. 300,548. Divided and this application Dec. 21, 1965, Ser. No. 535,622
2 Claims. (Cl. 336—200)

Figures 1, 1A, 2, 3, 3A, 4, 4A, 5, 6, 7, 8:
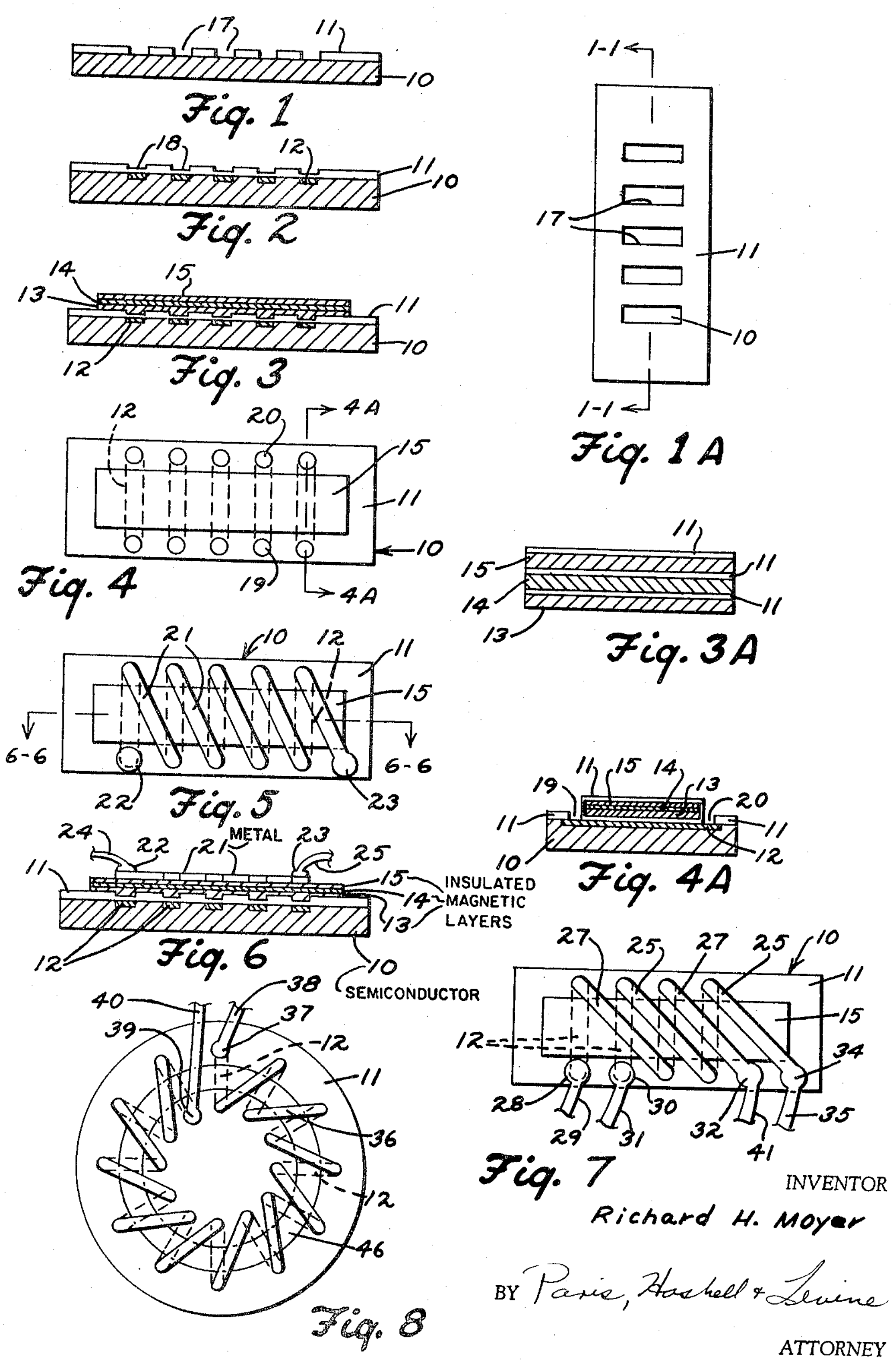

This is a division of application Serial No. 300,548, filed August 7, 1963.

This invention generally relates to micro inductors and transformers having magnetic cores, and to processes of manufacturing these components, and more particularly to such articles and processes involving their manufacture a combination of semiconductor integration technology and thin film deposition technology.

Very generally according to the present invention, there is provided a micro inductor structure and process wherein a series of conductors are provided as an integrated part of a semiconducting body by the application of integrated circuit technology. The semiconductor body is then coated with magnetic material overlying the integrated conductors and then is plated with a series of conductors overlying the magnetic layer, with the plated conductors being in proper alignment with the integrated conductors such that the combination of the plated conductors and the integrated conductors provide a continuous electrical path about the magnetic core. The present state of the art in semiconductor integration technology and in thin film coating technology permits a highly precise formation of the inductor coil and deposited magnetic layer to provide micro sized inductors having precisely controllable electrical and magnetic characteristics. These micro inductors may be provided in any one of a number of different shapes and sizes, as well as with a greater or lesser number of coils. Thus according to the present invention, there can be provided in-line inductors, toroidal inductors, or any combination thereof as well as micro transformers of various configurations.

It is accordingly a principal object of the present invention to provide improvements in micro inductors having magnetic cores, and improvements in the manufacturing processes for such articles.

A further object is to provide such articles having precisely controllable dimensions and the electrical characteristics.

Still another object is to provide such micro inductors that may be formed in any desired configuration by following the preferred process of manufacture of the present invention.

A still further object of the present invention is to provide improved processes for manufacturing micro inductors and transformers that may be readily reproduced with identical characteristics.

Other objects and many additional advantages will be more readily understood by those skilled in the art after a detailed consideration of the following specification taken with the accompanying drawing wherein:

FIG. 1A is a plan view of a wafer of semiconducting material having a masking layer on its upper surface, FIGS. 1, 2 and 3 are cross-sectional views taken along lines 1—1 of FIG. 1A and illustrating successive stages of manufacture of the micro inductance, FIG. 3A is an enlarged sectional view showing the insulation between the layers of deposited magnetic material, FIG. 4 is a plan view, similar to FIG. 1A, and illustrating the inductance at one of the final stages of its manufacture, FIG. 4A is a cross-sectional view taken through lines 4A—4A of FIG. 4, FIG. 5 is a plan view, similar to FIGS. 1A and 4, and illustrating the completed micro inductance, FIG. 6 is a cross-sectional view taken through lines 6—6 of FIG. 5, FIG. 7 is a plan view, similar to FIG. 5, and illustrating a micro transformer, manufactured according to the invention, and FIG. 8 is a plan view illustrating a toroidally shaped micro inductance manufactured according to the process of the present invention.

Referring now to the drawings for a detailed consideration of a preferred process for manufacturing a micro inductance according to the present invention, there is shown in FIGS. 1 to 6, a micro inductance at various stages of its manufacture. As shown in FIG. 1 a wafer 10 is initially provided of a semiconducting material such as silicon having, for example, an N-type impurity therein. This wafer 10 has formed thereon as an initial step of the invention, a coating 11 entirely covering the upper surface of the wafer. Preferably, this coating is formed of a silicon dioxide, and various methods of producing such a layer are known in the art, as, for example, by heating and exposing the silicon wafer to an atmosphere of steam, air, or oxygen and air, or by utilizing an oxidizing agent such as $HNO_3$ or the like. This oxide coating or layer 11 is formed into a mask having a plurality of parallel arranged rectangular openings 17 therein, which may be accomplished with photolithographic techniques followed by etching, as for example, etching of the oxide layer with hydrofluoric acid, using the photolithic layer as a mask. After completion of this step, there is provided, as shown in FIG. 1 and FIG. 1A, a silicon wafer 10 that is selectively covered by a protective coating of oxide 11 and having a series of openings 17 to expose the surface of the silicon in the desired pattern of a series of parallel arranged rectangular openings or stripes 17.

In the next step of manufacture, impurities of the opposite type than the wafer are diffused at a high temperature into the wafer 10 through the openings 17 of the mask 11 so as to produce a series of spaced parallel conducting regions or portions 12 within the wafer as shown in FIG. 2. These portions 12 are highly conductive stripes disposed in a parallel arrangement within the silicon wafer, as shown.

The diffusion of the impurities into the wafer of silicon 10, is performed in an oxidizing atmosphere, so that as indicated in FIG. 2, an oxide layer 18 is formed over the stripes to cover the surface of the silicon wafer.

In the next step, as is generally illustrated in FIG. 3, a series of thin layers of magnetic material 13, 14, and 15 are successively evaporated over a pre-selected portion of the silicon wafer to overlie the highly conductive stripes 12 that have been previously diffused into the wafer. The location of the evaporated layers of magnetic material with respect to the diffused stripes 14 is shown in FIG. 4, and as noted, completely overlies the central portions of the diffused stripes 12, but leaving the end portions of the stripes accessible from the surface of the wafer. For depositing the magnetic layers 13, 14, 15, in the rectangular configuration shown a metal mask (not shown) may be applied over the surface of the wafer, and the magnetic material may be evaporated as layers of thin film through the rectangular opening provided in this mask. Alternatively, photoresist techniques may be employed to define the selected rectangular area where it is desired to deposit the magnetic material, in the same manner as was employed in the earlier steps of the process to define the cut-out regions 17 of the oxide mask as in FIG.

1A. The magnetic material employed may be of conventional magnetic compounds comprised of iron, nickel, and the like, that are well known in the art of magnetic core inductances, and further details are accordingly not believed necessary.

As illustrated in FIG. 3A, there is preferably provided an insulation layer 11 between each of the deposited layers of magnetic material, 13, 14, and 15, respectively, and these insulation layers 11 may be thin layers of oxide 11. This is easily performed after evaporating each layer of magnetic material by back filling the evaporator with oxygen and maintaining the silicon wafer heated at an elevated temperature, or by evaporating a thin coating silicon monoxide onto the surface of each magnetic layer.

Each of the layers of magnetic material and oxide coating is deposited in sequence, with the layer 13 being first evaporated and deposited, and then a layer of oxide being formed thereover. Next the magnetic layer 14 and a layer of oxide 11, and finally the third magnetic layer 15, with a final layer of oxide thereover. This final layer of oxide or silicon oxide completely covers the magnetic material as well as the remainder of the silicon wafer, whereby the magnetic layers are completely insulated from one another and from the wafer.

In the following step as is generally illustrated in FIG. 4, an upper series of holes or openings 20 are provided in a linear array adjacent and along the upper edge of the wafer, with each of the openings 20 passing through the oxide or silicon oxide coating 11 and being in alignment to expose the end of a different one of the diffused metal stripes 12, thereby to provide access to one end of each of the diffused metal stripes 12. Similarly, there is provided a lower series of openings or holes 19 through the oxide coating 11 adjacent the lower edge of the wafer and each in alignment with the diffused metal stripes 12 to expose and provide access to the lower terminals of the stripes 12. These upper and lower openings 20 and 19 may be formed by employing a photoresist mask over the wafer having openings therein in the proper alignment with the metal stripes 12, and then etching the oxide coating uncovered by the mask to selectively provide the two series of openings 19 and 20 through the oxide coating as described.

In the final steps of the process, as illustrated in FIGS. 5 and 6, a photoresist or other mask (not shown) is again applied to the wafer covering all areas of its upper surface except paths leading between the diagonally opposite ends of the conductor stripes 12. After this mask is applied, a series of metal interconnecting conductors 21 are evaporated onto the wafer to electrically interconnect the diagonally opposite ends of adjoining ones of the stripes 12 thereby to electrically interconnect the stripes and provide a continuous electrical path through the stripes 12 and through the deposited conductors 21, leading from one end of the wafer to the other. In evaporating the metal film conductors 21, metal is also deposited into the upper and lower series of openings 19 and 20 such that the metal conductors 21 electrically interconnect each of the diffused stripes 12 to the next in the described manner to provide a continuous conductor leading from one end of the wafer to the other. It will be noted that the metal conducting paths provided by the diffused stripes 12 and the deposited film conductors 21 encircle the deposited magnetic layers 13, 14, and 15 to effectively provide an inductance coil that encircles the magnetic layers. At each of the opposite ends of this inductance, larger metal lands 22 and 23 are deposited for attachment to external electrical conducting leads 24 and 25, as best shown in FIG. 6, thereby to enable the external electrical conductors 24 and 25 to be easily attached to the micro inductance.

Thus, as shown in the cross-sectional view of FIG. 6, the micro inductance comprises a silicon wafer 10 having a series of diffused conducting stripes 12 therein, a series of thin magnetic layers 13, 14, and 15, disposed above the diffused metal stripes, and a series of deposited thin conductors 21 being disposed above the magnetic material layers and interconnecting the diffused stripes 12 to provide a sinuous conducting path completely surrounding the magnetic material layers along their length, thereby to provide a magnetic core inductance. It will be noted from FIG. 6, that the conductors surrounding the magnetic layers are completely insulated from the layers by means of a thin oxide coating, and the deposited metal magnetic layers 13, 14, and 15 are also electrically insulated from one another by thin oxide layers 11 as best shown in FIG. 3A.

As is now believed evident to those skilled in the art, various configurations of this micro inductance construction may be provided by following the above teachings. For example, in FIG. 8, there is shown a toroidally shaped inductance which may be manufactured using these same process steps. In this construction, the silicon wafer may be initially provided as a circular disc with the diffused metal stripes 12 being provided therein in the form of spaced radially arranged conductors that are symmetrically diffused in the circular pattern shown. The thin film magnetic layers, are deposited in the configuration of rings 46 or toroids, with a series of such toroidally shaped magnetic layers being provided one on top of the other in the same manner as shown in FIG. 3A. Thereafter, in the final steps, the end terminals of each of the diffused metal stripes 12 are made accessible by providing openings through the oxide layer to expose the ends of these stripes, and metallic conductors 36 are then deposited in the desired arrangement to interconnect the diagonally opposite end of each stripe to that of the next, thereby to provide a continuous conductor coil circumambiently about the magnetic core. At the end of this integrated and deposited coil structure, metal lands 37 and 39 are provided, and electrical conducting leads 38 and 40 are suitably attached to these metal lands to provide electrical connection to the micro toroid.

FIG. 7 illustrates a bifilar micro transformer structure that may be provided according to the same process as described above. In this embodiment, a first series of metal conductors 27 are deposited in such fashion as to interconnect the opposite ends of every other alternate one of the diffused metal stripes to form a first coil and a second series of deposited conductors 25 interconnecting the remaining stripes to provide a second coil having turns between each turn of the first coil thereby to provide two side-by-side inductance paths or coils, as shown, rather than one continuous conducting inductance coil as in the embodiment of FIG. 5. A first pair of metal lands 28 and 32 are deposited at the end terminals of one of the inductances for interconnection with electrical conducting leads 29 and 41, and a second pair of enlarged metal lands 30 and 34 are provided at the opposite terminals of the second inductance for interconnection with electrical conducting leads 31 and 35. In a manner similar to that described, the two coils of the micro transformer may also be provided in side-by-side arrangement (not shown) rather than in bifilar configuration, either on a toroidally shaped magnetic core, as shown in FIG. 8, or about an otherwise shaped magnetic core as might be desired.

Although but one preferred embodiment of the invention has been illustrated and described, it is believed evident that many changes may be made by those skilled in the art without departing from the spirit and scope of this invention. For example, the micro inductance or micro transformer according to the present invention may be further integrated and combined with other elements in the nature of transistors, diodes, or capacitors, which other elements may also be integrally formed within the silicon wafer 10, and thereby integrated with the micro transformer or inductance structure. For example, a voltage tunable capacitor may be diffused into the silicon wafer 10 (not shown) and combined with the micro inductance to provide a tuned circuit. Such diffused type capacitances, as is well known in the art, are voltage variable, and consequently such integrated micro inductance-capacitor unit would be responsive to the amplitude of an applied voltage to vary the reactance of the circuit. Since these and many other changes may be made by those skilled in the art, this invention is to be considered as being limited only according to the following claims appended hereto.

What is claimed is:

1. A micro inductor having a magnetic core comprising a substrate of semiconducting material, a plurality of spaced conductors integrated within the substrate and electrically insulated from the surface of the substrate, a thin layer of magnetic material supported by the substrate and overlying the integrated conductors, and a series of thin film conductors supported over the magnetic layer and having portions passing through the surface of the substrate to interconnect the integrated conductors within the substrate and form a continuous conducting path encircling the magnetic layers.

2. A micro transformer structure incorporating the inductor of claim 1, and comprising a second series of spaced conductors integrated within the substrate, and a second series of thin film conductors supported over the magnetic layer and having portions passing through the surface of the substrate to interconnect the second series of integrated conductors within the substrate and form a second continuous path encircling the magnetic layer and being inductively coupled with the first continuous conducting path.

References Cited by the Examiner

UNITED STATES PATENTS

| | | | |
|---|---|---|---|
| 2,584,592 | 2/1952 | Kehbel | 336—200 X |
| 3,210,707 | 10/1965 | Constantakes | 336—200 |
| 3,213,430 | 10/1965 | Oshima | 340—174 |
| 3,221,215 | 11/1965 | Osafune | 317—101 |

LEWIS H. MYERS, *Primary Examiner.*

E. GOLDBERG, *Assistant Examiner.*